United States Patent
Mastbergen et al.

(10) Patent No.: US 10,995,705 B2
(45) Date of Patent: May 4, 2021

(54) MODULAR EXHAUST GAS RECIRCULATION SYSTEM

(71) Applicant: Woodward, Inc., Fort Collins, CO (US)

(72) Inventors: Daniel B. Mastbergen, Loveland, CO (US); Domenico Chiera, Fort Collins, CO (US); Gregory James Hampson, Boulder, CO (US); Yi Han, Fort Collins, CO (US); James Po-Chang Chiu, Longmont, CO (US); Doug Leone, Fort Collins, CO (US); Henry David Gemmill Knutzen, Loveland, CO (US); Samuel James McCreery, Loveland, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 16/269,735

(22) Filed: Feb. 7, 2019

(65) Prior Publication Data
US 2020/0256266 A1 Aug. 13, 2020

(51) Int. Cl.
*F02M 26/10* (2016.01)
*F02M 26/19* (2016.01)
(Continued)

(52) U.S. Cl.
CPC .......... *F02M 26/10* (2016.02); *F01M 13/023* (2013.01); *F02D 41/0002* (2013.01);
(Continued)

(58) Field of Classification Search
CPC .............................. F02M 26/10; F02M 26/19
See application file for complete search history.

(56) References Cited

U.S. PATENT DOCUMENTS

| 2,354,179 A | 7/1944 | Blanc |
| 3,680,534 A | 8/1972 | Chavant |

(Continued)

FOREIGN PATENT DOCUMENTS

| CN | 202125377 | 1/2012 |
| CN | 103306858 | 9/2013 |

(Continued)

OTHER PUBLICATIONS

International Search Report and Written opinion in International Application No. PCT/US2020/017155, dated May 27, 2020, 14 pages.

(Continued)

*Primary Examiner* — Kevin R Steckbauer
(74) *Attorney, Agent, or Firm* — Fish & Richardson P.C.

(57) ABSTRACT

A convergent nozzle is in a mixer housing and in a flow path from an air inlet of the mixer to an outlet of the mixer. A convergent-divergent nozzle is in the mixer housing and includes an air-exhaust gas inlet in fluid communication to receive fluid flow from the convergent nozzle and from the interior of the exhaust gas housing. A first nozzle module is configured to be received in the mixer housing and, when received in the mixer housing, define at least a portion of the convergent nozzle or the convergent-divergent nozzle. A second nozzle module is configured to be received in the mixer housing separate from the first nozzle module. The second nozzle module, when received in the mixer housing, is configured to define at least a portion of the convergent or the convergent-divergent nozzle. The second nozzle module has a different flow characteristic than the first nozzle module.

23 Claims, 9 Drawing Sheets

(51) Int. Cl.
*F01M 13/02* (2006.01)
*F02D 41/00* (2006.01)
*F02M 35/10* (2006.01)
*F02M 26/05* (2016.01)
*F02M 26/07* (2016.01)

(52) U.S. Cl.
CPC ......... *F02D 41/0052* (2013.01); *F02M 26/19* (2016.02); *F02M 35/10052* (2013.01); *F02D 41/0072* (2013.01); *F02D 2041/0017* (2013.01); *F02M 26/05* (2016.02); *F02M 26/07* (2016.02); *F02M 35/10222* (2013.01)

(56) References Cited

U.S. PATENT DOCUMENTS

| | | | |
|---|---|---|---|
| 4,069,797 A | 1/1978 | Nohira et al. | |
| 4,183,333 A | 1/1980 | Aoyama | |
| 4,203,400 A | 5/1980 | Yorioka | |
| 4,249,503 A | 2/1981 | Noguchi et al. | |
| 4,271,795 A | 6/1981 | Nakagawa et al. | |
| 5,611,203 A | 3/1997 | Henderson et al. | |
| 5,611,204 A | 3/1997 | Radovanovic et al. | |
| 5,974,802 A * | 11/1999 | Blake | F02M 26/34 |
| | | | 123/568.12 |
| 6,003,316 A | 12/1999 | Baert et al. | |
| 6,216,458 B1 | 4/2001 | Alger et al. | |
| 6,267,106 B1 * | 7/2001 | Feucht | F02M 26/19 |
| | | | 123/568.17 |
| 6,343,594 B1 * | 2/2002 | Koeslin | F02M 26/19 |
| | | | 123/568.11 |
| 6,408,833 B1 | 6/2002 | Faletti | |
| 6,425,382 B1 | 7/2002 | Marthaler et al. | |
| 6,470,864 B2 | 10/2002 | Kim et al. | |
| 6,609,373 B2 | 8/2003 | Coleman et al. | |
| 6,609,374 B2 | 8/2003 | Feucht et al. | |
| 6,640,542 B2 * | 11/2003 | Coleman | F02B 37/00 |
| | | | 60/605.2 |
| 6,659,092 B2 | 12/2003 | Coleman et al. | |
| 6,729,133 B1 | 5/2004 | Sorter et al. | |
| 6,732,524 B2 | 5/2004 | Sponton | |
| 6,776,146 B1 | 8/2004 | Ricart-Ugaz et al. | |
| 6,810,725 B2 * | 11/2004 | Henderson | G01F 1/44 |
| | | | 73/114.74 |
| 6,880,535 B2 * | 4/2005 | Sorter | F02M 21/047 |
| | | | 123/528 |
| 6,886,544 B1 * | 5/2005 | Bui | F02M 35/10118 |
| | | | 123/568.17 |
| 6,983,645 B2 | 1/2006 | Webb et al. | |
| 7,032,578 B2 * | 4/2006 | Liu | F02M 35/10118 |
| | | | 123/568.15 |
| 7,040,305 B2 | 5/2006 | Sponton | |
| 7,140,874 B2 | 11/2006 | Ingalls, Jr. et al. | |
| 7,175,422 B2 | 2/2007 | Webb et al. | |
| 7,178,492 B2 | 2/2007 | Coleman et al. | |
| 7,191,743 B2 | 3/2007 | Weber et al. | |
| 7,212,926 B2 | 5/2007 | Ingalls, Jr. et al. | |
| 7,252,077 B2 | 8/2007 | Berggren | |
| 7,261,096 B2 | 8/2007 | Berggren et al. | |
| 7,277,801 B2 | 10/2007 | Webb et al. | |
| 7,281,530 B2 | 10/2007 | Usei | |
| 7,299,137 B2 | 11/2007 | Bartley et al. | |
| 7,311,090 B2 | 12/2007 | Lyons | |
| 7,322,193 B2 | 1/2008 | Bering et al. | |
| 7,347,086 B2 | 3/2008 | Webb et al. | |
| 7,389,770 B2 | 6/2008 | Bertilsson et al. | |
| 7,412,335 B2 | 8/2008 | Anderson et al. | |
| 7,550,126 B2 | 6/2009 | Webb et al. | |
| 7,552,722 B1 * | 6/2009 | Shieh | F02M 26/19 |
| | | | 123/568.17 |
| 7,578,179 B2 | 8/2009 | Krueger et al. | |
| 7,597,016 B2 | 10/2009 | Timmons et al. | |
| 7,669,411 B2 | 3/2010 | Mallampalli et al. | |
| 7,712,314 B1 | 5/2010 | Barnes et al. | |
| 7,748,976 B2 | 7/2010 | Burrahm et al. | |
| 7,833,301 B2 | 11/2010 | Schindler et al. | |
| 7,854,118 B2 | 12/2010 | Vetrovec | |
| 7,886,727 B2 * | 2/2011 | Ulrey | F02D 9/12 |
| | | | 123/568.15 |
| 7,934,492 B2 | 5/2011 | Gerum | |
| 8,047,185 B2 * | 11/2011 | Ulrey | F02D 41/0065 |
| | | | 123/568.21 |
| 8,056,340 B2 | 11/2011 | Vaught et al. | |
| 8,061,120 B2 | 11/2011 | Hwang | |
| 8,425,224 B2 | 4/2013 | Webb et al. | |
| 8,821,349 B2 | 9/2014 | Cunningham et al. | |
| 9,051,900 B2 * | 6/2015 | Teng | F02B 31/04 |
| 9,074,540 B2 | 7/2015 | Subramanian | |
| 9,239,034 B2 | 1/2016 | Cunningham et al. | |
| 9,303,557 B2 | 4/2016 | Ulrey et al. | |
| 9,309,837 B2 | 4/2016 | Ulrey et al. | |
| 9,448,091 B2 | 9/2016 | Woodsend | |
| 9,488,098 B2 | 11/2016 | Sponsky | |
| 9,546,591 B2 | 1/2017 | Ge | |
| 9,651,004 B2 | 5/2017 | Zhang | |
| 9,695,785 B2 | 7/2017 | Roth et al. | |
| 9,816,466 B2 | 11/2017 | Roth et al. | |
| 9,863,371 B2 * | 1/2018 | El Gammal | F02M 35/10222 |
| 10,036,353 B2 * | 7/2018 | Shuto | F02M 26/04 |
| 10,316,803 B2 * | 6/2019 | Hampson | F02M 35/10222 |
| 10,634,099 B2 * | 4/2020 | Hampson | F02M 21/047 |
| 2003/0111065 A1 * | 6/2003 | Blum | F02M 35/10222 |
| | | | 123/568.17 |
| 2004/0173192 A1 | 9/2004 | Sorter et al. | |
| 2005/0247284 A1 | 11/2005 | Weber et al. | |
| 2006/0021346 A1 | 2/2006 | Whelan et al. | |
| 2006/0168958 A1 | 8/2006 | Vetrovec | |
| 2007/0039321 A1 | 2/2007 | Sheidler | |
| 2010/0300413 A1 * | 12/2010 | Ulrey | F02M 35/10222 |
| | | | 123/518 |
| 2011/0265772 A1 * | 11/2011 | Teng | F02M 35/10262 |
| | | | 123/568.11 |
| 2012/0180478 A1 | 7/2012 | Johnson et al. | |
| 2013/0276766 A1 | 10/2013 | Rajkumar | |
| 2013/0319381 A1 | 12/2013 | Piaz | |
| 2014/0224232 A1 * | 8/2014 | Hotta | F02M 35/10222 |
| | | | 123/574 |
| 2014/0238364 A1 | 8/2014 | Beyer et al. | |
| 2015/0047317 A1 | 2/2015 | Ulrey et al. | |
| 2015/0047618 A1 | 2/2015 | Ulrey et al. | |
| 2015/0059713 A1 | 3/2015 | Forshier | |
| 2015/0083085 A1 | 3/2015 | Ravenhill et al. | |
| 2015/0267650 A1 | 9/2015 | Siuchta et al. | |
| 2015/0285192 A1 | 10/2015 | Roth et al. | |
| 2015/0369126 A1 | 12/2015 | Knopfel et al. | |
| 2016/0319778 A1 * | 11/2016 | Shuto | F02M 35/10144 |
| 2017/0022941 A1 | 1/2017 | Mallard | |
| 2017/0030305 A1 | 2/2017 | Sugiyama | |
| 2017/0058839 A1 * | 3/2017 | El Gammal | F02M 35/10222 |
| 2017/0306899 A1 * | 10/2017 | Sanami | F02M 26/17 |
| 2019/0093604 A1 * | 3/2019 | Hampson | F02M 26/19 |
| 2019/0257274 A1 * | 8/2019 | Hampson | F02M 26/05 |

FOREIGN PATENT DOCUMENTS

| | | | |
|---|---|---|---|
| CN | 103397959 | 11/2013 | |
| CN | 203335295 | 12/2013 | |
| CN | 203499859 | 3/2014 | |
| CN | 204386776 | 6/2015 | |
| CN | 207920739 | 9/2018 | |
| CN | 207920739 U * | 9/2018 | ............ F02M 26/19 |
| DE | 181618 | 3/1907 | |
| DE | 19587578 | 6/1999 | |
| DE | 10054264 | 5/2002 | |
| EP | 0653559 | 5/1995 | |
| EP | 0732490 | 9/1996 | |
| EP | 1020632 B1 | 7/2000 | |
| EP | 1859128 B1 | 7/2008 | |
| EP | 2562397 | 2/2013 | |
| FR | 2902466 | 12/2007 | |
| FR | 2893988 B1 | 1/2008 | |
| GB | 2313623 | 12/1997 | |
| GB | 2356223 | 5/2001 | |

(56) References Cited

FOREIGN PATENT DOCUMENTS

| | | |
|---|---|---|
| GB | 2421543 | 6/2006 |
| GB | 2438360 | 11/2007 |
| JP | H 09195860 | 7/1997 |
| JP | H 10131742 | 5/1998 |
| JP | H 11324812 | 11/1999 |
| JP | 2000097111 | 4/2000 |
| JP | 2000230460 | 8/2000 |
| JP | 2002221103 | 8/2002 |
| JP | 2004100508 | 4/2004 |
| JP | 2005147010 | 6/2005 |
| JP | 2005147011 | 6/2005 |
| JP | 2005147030 | 6/2005 |
| JP | 2005147049 | 6/2005 |
| JP | 2006132373 | 5/2006 |
| JP | 2007092592 | 4/2007 |
| JP | 2009299591 | 12/2009 |
| JP | 2010101191 | 5/2010 |
| JP | 2013087720 | 5/2013 |
| JP | 2013113097 | 6/2013 |
| JP | 2013170539 | 9/2013 |
| JP | 5530267 | 6/2014 |
| JP | 5916335 | 5/2016 |
| JP | 5935975 | 6/2016 |
| JP | 5938974 | 6/2016 |
| JP | 6035987 | 11/2016 |
| JP | 6051881 | 12/2016 |
| WO | WO2015069330 | 5/2015 |

OTHER PUBLICATIONS

International Search Report and Written Opinion in International Application No. PCT/US2018/052637, dated Dec. 21, 2018, 6 pages.

Office Action issued in Chinese Application No. 201721556484.3 dated May 14, 2018; 3 pages.

* cited by examiner

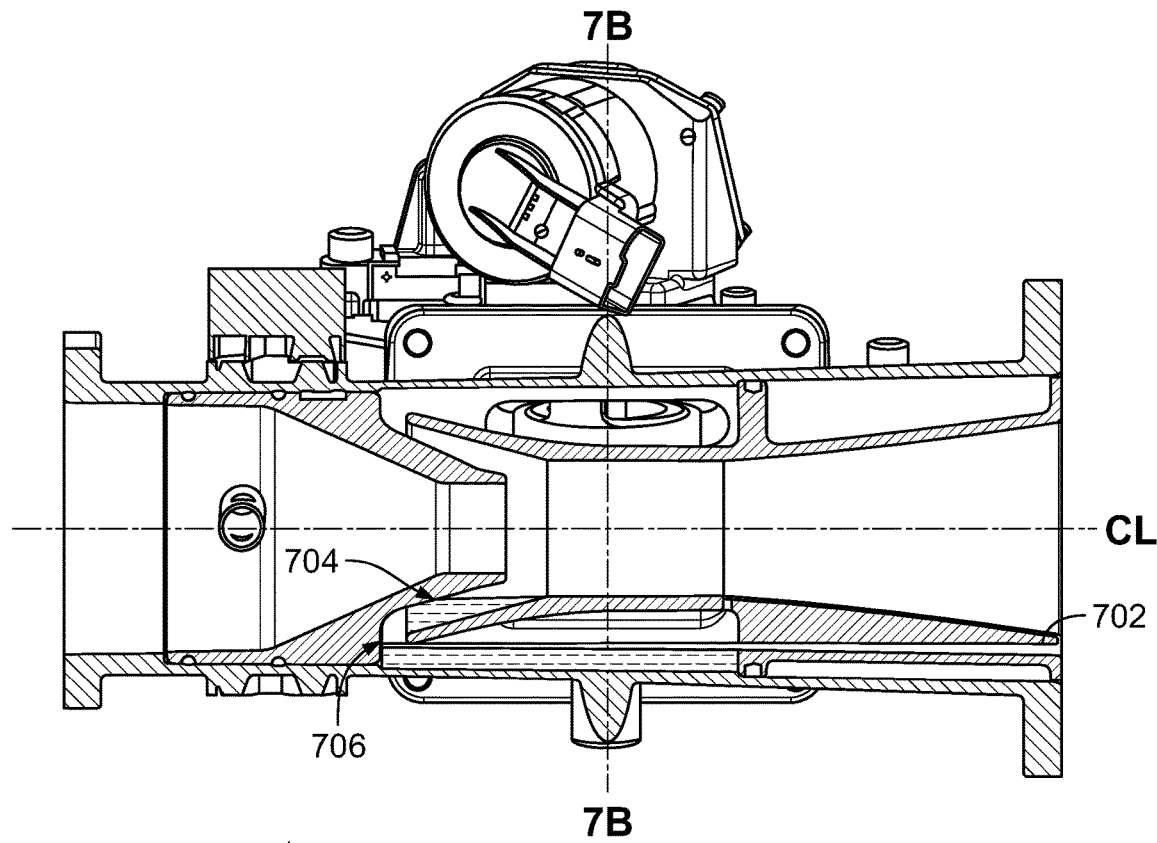
FIG. 7A
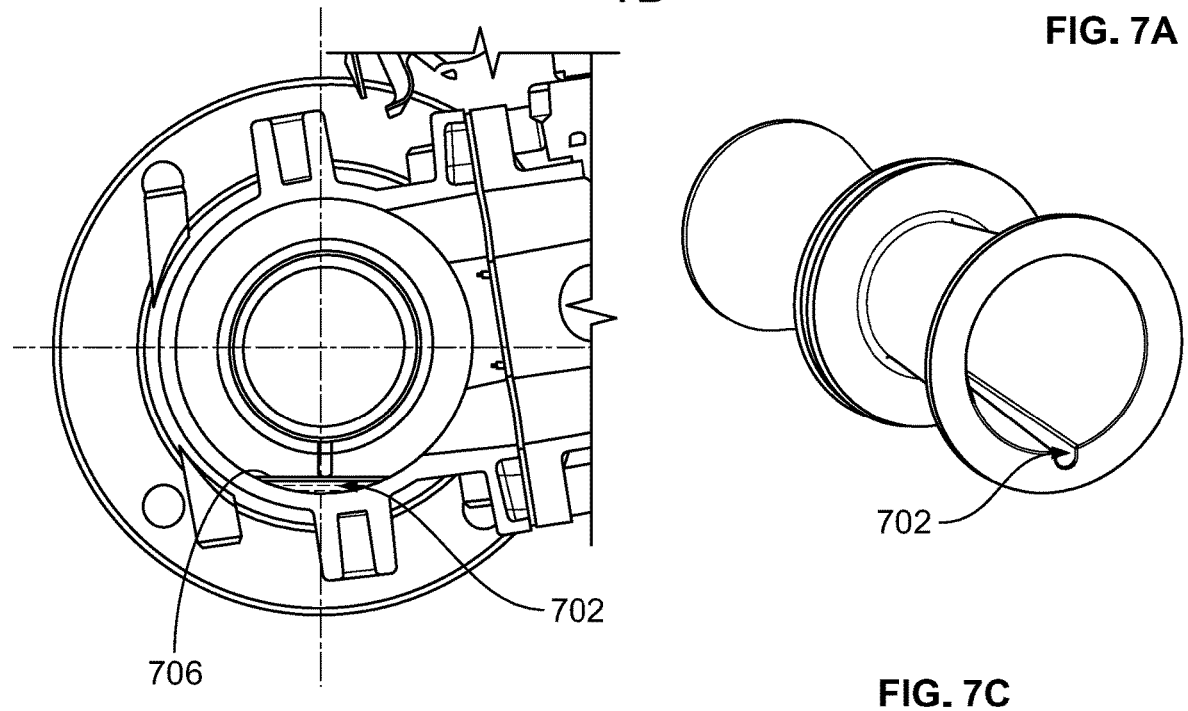
FIG. 7B
FIG. 7C

MODULAR EXHAUST GAS RECIRCULATION SYSTEM

TECHNICAL FIELD

This disclosure relates to exhaust gas recirculation (EGR) systems for internal combustion engines.

BACKGROUND

Exhaust gas recirculation (EGR), especially cooled EGR (cEGR), can be added to internal combustion engine systems to reduce NOx emissions and reduce knock tendency. In such a system, an amount of exhaust gas is added to the air and/or fuel mixture within the air-intake manifold of the engine. The challenge is that there is a cost to deliver the cEGR, especially for high efficiency engines which generally are most efficient when the exhaust manifold pressure is lower than the intake manifold pressure. The pressure difference creates a positive scavenging pressure difference across the engine which scavenges burn gas from the cylinder well and provides favorable pressure-volume pumping loop work. It is particularly challenging to deliver cEGR from its source at the exhaust manifold to the intake manifold without negatively impacting the residual gas scavenging and efficiency of the engine cycle via the pumping loop. The "classic" high pressure loop cEGR system plumbs the exhaust gas directly to the intake manifold, which requires either design or variable turbocharging to force the engine exhaust manifold pressure to be higher than the intake manifold, which in turn, unfavorably reduces scavenging of hot burned gases and engine P-V cycle and loses efficiency. It is particularly counterproductive since the purpose of the cEGR is to reduce the knock tendency to improve efficiency and power density. However, this classic method to drive EGR actually increases the knock tendency through residual gas retention and reduces efficiency through negative pressure work on the engine—in a manner of diminishing returns, i.e., two steps forward to reduce knock with cEGR, but one step back due to how it is pumped, leading to a zero gain point where the cost of driving cEGR counteracts the benefits of delivering it.

SUMMARY

This disclosure describes technologies relating to recirculating exhaust gas.

An example implementation of the subject matter described within this disclosure is an exhaust gas recirculation mixer system with the following features. An exhaust gas housing include an exhaust gas inlet into an interior of the exhaust gas housing. A convergent nozzle is in a mixer housing and in a flow path from an air inlet of the mixer to an outlet of the mixer. The convergent nozzle converges toward the outlet of the mixer. A convergent-divergent nozzle is in the mixer housing and includes an air-exhaust gas inlet in fluid communication to receive fluid flow from the convergent nozzle and from the interior of the exhaust gas housing. A first nozzle module is configured to be received in the mixer housing and, when received in the mixer housing, define at least a portion of the convergent nozzle or the convergent-divergent nozzle. A second nozzle module is configured to be received in the mixer housing when the first nozzle module is not in mixer housing. The second nozzle module, when received in the mixer housing, is configured to define at least a portion of the convergent or the convergent-divergent nozzle. The second nozzle module has a different flow characteristic than the first nozzle module.

Aspects of the example implementation, which can be combined with the example implementation alone or in combination, include the following. The first nozzle module defines a portion of the convergent nozzle.

Aspects of the example implementation, which can be combined with the example implementation alone or in combination, include the following. The second nozzle module defines a portion of the convergent-divergent nozzle.

Aspects of the example implementation, which can be combined with the example implementation alone or in combination, include the following. An inlet of the convergent-divergent nozzle is positioned to receive an air-exhaust-fuel mixture.

Aspects of the example implementation, which can be combined with the example implementation alone or in combination, include the following. A first pressure port is positioned at a convergent end of the convergent nozzle. The first pressure port provides a location to sense a first pressure at the convergent end of the convergent nozzle.

Aspects of the example implementation, which can be combined with the example implementation alone or in combination, include the following. A second pressure port is upstream of a convergent portion of the convergent nozzle. The second pressure port provides a location to sense a second pressure upstream of the convergent nozzle Aspects of the example implementation, which can be combined with the example implementation alone or in combination, include the following. A third pressure port is positioned in a throat of the convergent-divergent nozzle. The third pressure port provides a location to sense a third pressure within the throat of the convergent-divergent nozzle. A fourth pressure port is positioned downstream of the divergent portion of the convergent-divergent nozzle. The fourth pressure port provides a location to sense a third pressure downstream of the convergent-divergent nozzle.

Aspects of the example implementation, which can be combined with the example implementation alone or in combination, include the following. A liquid channel is defined by the convergent-divergent nozzle. The liquid channel has an inlet positioned between the convergent nozzle and the convergent-divergent nozzle. The liquid channel is positioned and sized to direct and regulate liquid drop-out towards an outlet of the exhaust gas recirculation mixer.

Aspects of the example implementation, which can be combined with the example implementation alone or in combination, include the following. An inner surface of the interior receiver cavity is non-circular, having a greater radius along an upper portion of the interior receiver cavity than the lower portion of the interior receiver cavity.

Aspects of the example implementation, which can be combined with the example implementation alone or in combination, include the following. A throat of the convergent-divergent nozzle has a greater cross-sectional area than a convergent end of the convergent nozzle.

Aspects of the example implementation, which can be combined with the example implementation alone or in combination, include the following. A cross-sectional area of a throat of the convergent-divergent nozzle is 1.1-3 times greater than a cross-sectional area of a convergent end of the convergent nozzle.

An example implementation of the subject matter described within this disclosure is a method with the following features. Identical exhaust mixer housings are received. A first set of nozzle modules is inserted into a first set of the substantially identical exhaust mixer housings to produce a first convergent and convergent-divergent nozzle arrangement. A second set of nozzle modules is inserted into a second set of the identical exhaust mixer housing to produce a second, different convergent and convergent divergent nozzle arrangement.

Aspects of the example implementation, which can be combined with the example implementation alone or in combination, include the following. The first set of nozzle modules is a set of convergent nozzles.

Aspects of the example implementation, which can be combined with the example implementation alone or in combination, include the following. The first set of nozzle modules is a set of convergent-divergent nozzles.

Aspects of the example implementation, which can be combined with the example implementation alone or in combination, include the following. The second convergent and convergent-divergent nozzle arrangement has different flow characteristics than the first convergent and convergent-divergent nozzle arrangement.

Aspects of the example implementation, which can be combined with the example implementation alone or in combination, include the following. The second set of nozzle modules includes a second set of convergent-divergent nozzles having a different cross-sectional area of a throat than the first set of nozzles.

Aspects of the example implementation, which can be combined with the example implementation alone or in combination, include the following. The second set of nozzle modules includes a second set of convergent nozzles having a different cross-sectional area of a convergent end than the first set of nozzles.

An example implementation of the subject matter describes within this disclosure is an engine system with the following features. An intake manifold is configured to receive a combustible mixture configured to be combusted within a combustion chamber. A throttle is upstream of the intake manifold. The throttle is configured to at least partially regulate an air flow into the intake manifold. An exhaust manifold is configured to receive combustion products from the combustion chamber. An exhaust gas recirculation mixer system is downstream of the throttle and upstream of an intake manifold. The exhaust gas recirculation mixer includes an exhaust gas housing with an exhaust gas inlet into an interior of the exhaust gas housing. A convergent nozzle is in a mixer housing and in a flow path from an air inlet of the mixer to an outlet of the mixer. The convergent nozzle converges toward the outlet of the mixer. A convergent-divergent nozzle is in the mixer housing and includes an air-exhaust gas inlet in fluid communication to receive fluid flow from the convergent nozzle and from the interior of the exhaust gas housing. A first nozzle module is configured to be received in the mixer housing and, when received in the mixer housing, define at least a portion of the convergent nozzle or the convergent-divergent nozzle. A second nozzle module is configured to be received in the mixer housing when the first nozzle module is not in mixer housing. The second nozzle module, when received in the mixer housing, is configured to define at least a portion of the convergent or the convergent-divergent nozzle. The second nozzle module has a different flow characteristic than the first nozzle module.

Aspects of the example implementation, which can be combined with the example implementation alone or in combination, include the following. The recirculation mixer includes a first pressure port positioned upstream of the convergent nozzle. The first pressure port provides a location to sense a first pressure upstream of the convergent nozzle. A second pressure port is positioned at a convergent end of the convergent nozzle. The second pressure port provides a location to sense a second pressure at the convergent end of the convergent nozzle.

Aspects of the example implementation, which can be combined with the example implementation alone or in combination, include the following. A third pressure port is positioned in a throat of the convergent-divergent nozzle. The third pressure port provides a location to sense a third pressure within the throat of the convergent-divergent nozzle. A fourth pressure port is positioned downstream of the convergent-divergent nozzle. The fourth pressure port provides a location to sense a third pressure downstream of the convergent-divergent nozzle.

Aspects of the example implementation, which can be combined with the example implementation alone or in combination, include the following. A controller includes one or more processors and a non-transitory computer-readable storage medium coupled to the one or more processors and storing programming instructions for execution by the one or more processors. The programming instructions instruct the one or more processors to do the following. A first differential pressure between the first pressure location positioned upstream of the convergent nozzle and the second pressure location positioned at a convergent end of the convergent nozzle is determined. A mass air-flow rate is determined based on the first determined differential pressure. A second differential pressure between the third pressure location positioned in a throat of the convergent-divergent nozzle and fourth pressure location positioned downstream of the convergent-divergent nozzle is determined. An air-fuel-exhaust flow rate is determined based on the second measured differential pressure.

Aspects of the example implementation, which can be combined with the example implementation alone or in combination, include the following. A crank case is within an engine block. A first conduit fluidically connects the crank case to a point upstream of the throttle. A second conduit fluidically connects the crank case to a point downstream of the throttle. A pressure differential across the throttle causes air to flow through the crank case.

Aspects of the example implementation, which can be combined with the example implementation alone or in combination, include the following. The second conduit is fluidically connected to the exhaust gas recirculation mixer upstream of the convergent-divergent nozzle and downstream of the convergent nozzle.

The details of one or more implementations of the subject matter are set forth in the accompanying drawings and the description below. Other features, objects, and advantages of the subject matter will be apparent from the description and drawings, and from the claims.

DESCRIPTION OF DRAWINGS

FIGS. 7A-7C are a side cross-sectional view, a cross-sectional view along line 7B-7B, and a perspective view of an example EGR mixer with a liquid drain.

Like reference numbers and designations in the various drawings indicate like elements.

DETAILED DESCRIPTION

EGR can have parasitic effects on an engine system, that is, it can reduce the effective power output of an engine system as energy is required to move exhaust gas from an exhaust manifold into an intake manifold. This is especially problematic on forced induction engines where the intake manifold pressure can be higher than the exhaust manifold pressure. Ironically, EGR is most needed when the intake manifold pressure is high, such as when the engine is running at a high load. In the case of a turbo-charged engine, increased back-pressure within the exhaust manifold can also contribute to knock tendency under high loads.

The concepts herein relate to an EGR system that can be used on an internal combustion engine, including a forced induction internal combustion engine. A jet pump is added to the air intake system of the engine between the throttle and the intake manifold (although it could alternatively be placed upstream of the throttle as well). If a compressor is provided in the intake system, the jet pump can be placed downstream of the compressor (although it could alternatively be placed upstream of the compressor as well). Air, the primary fluid, is flowed through a central flow path of the jet pump from the throttle towards the intake manifold. In a low-pressure receiver region within the jet pump, recirculated exhaust gas is added to the air stream from the exhaust manifold. The lower effective pressure in the receiver allows for a pressure differential to form between the exhaust manifold and the receiver. The reverse Bernoulli Effect recovers the pressure by slowing down the high velocity/low pressure gas to create a pressure in the intake manifold that is equal to or higher than the exhaust manifold. So at the system level, the jet pump enables the exhaust gas to flow from the exhaust manifold to the intake manifold even when the exhaust manifold is at a lower pressure. Fuel can be added to the air stream upstream of the convergent end of a convergent nozzle. Turbulence is produced as the three streams combine within the jet pump leading to a well-mixed, combustible mixture flowing into the manifold.

Figure 1:
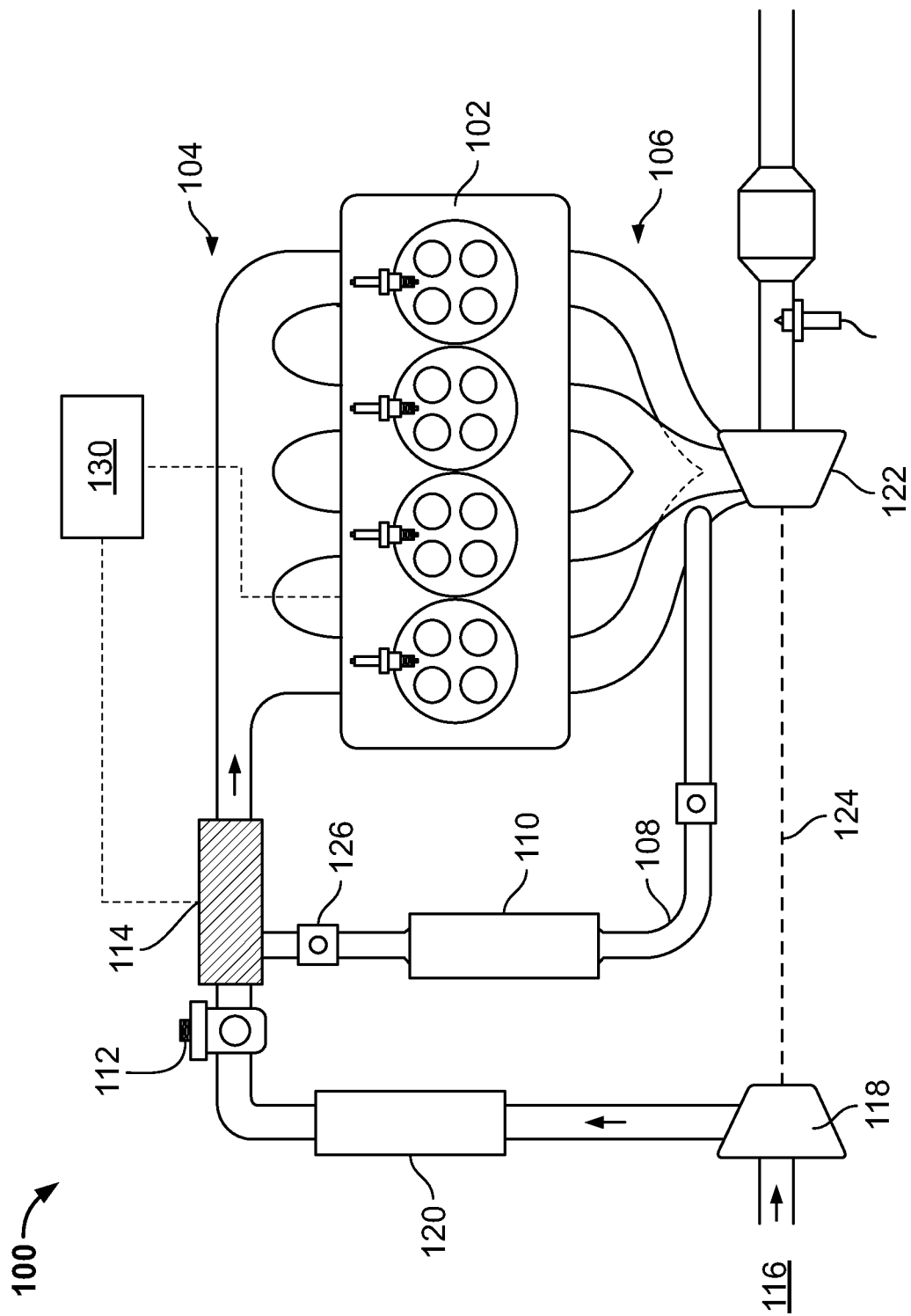
FIG. 1 is a schematic diagram of an example internal combustion engine system.

FIG. 1 shows an example engine system 100. The engine system 100 includes an intake manifold 104 configured to receive a combustible mixture to be combusted within a combustion chamber of the engine block 102. That is, the intake manifold is fluidically coupled to a source of oxygen and a source of fuel. The combustible mixture can include air and any combustible fluid, such as natural gas, atomized gasoline, or diesel. While the illustrated implementation includes a four-cylinder engine 102, any number of cylinders can be used. Also, while the illustrated implementation includes a piston engine 102, aspects of this disclosure can be applied to other types of internal combustion engines, such as rotary engines or gas turbine engines.

A throttle 112 is positioned upstream of the intake manifold 104. The throttle 112 is configured to regulate air flow into the intake manifold 104 from the ambient environment 116, for example, by changing a cross-sectional area of a flow passage going through the throttle 112. In some implementations, the throttle 112 can include a butterfly valve or a disc valve. Reducing the cross-sectional area of the flow passage through the throttle 112 reduces the flowrate of air flowing through the throttle 112 towards the intake manifold 104.

An exhaust manifold 106 is configured to receive combustion products (exhaust) from a combustion chamber of the engine block 102. That is, the exhaust manifold is fluidically coupled to an outlet of the combustion chamber. An EGR flow passage 108 or conduit fluidically connects the exhaust manifold 106 and the intake manifold 104. In the illustrated implementation, an EGR throttle valve 126 is located within the EGR flow passage 108 between the exhaust manifold 106 and the intake manifold 104 and is used to regulate the EGR flow. The EGR throttle valve 126 regulates the EGR flow by adjusting a cross-sectional area of the EGR flow passage 108 going through the EGR throttle valve 126. In some implementations, the EGR throttle valve 126 can include a butterfly valve, a disc valve, a needle valve, or another valve style.

The EGR flow passage feeds into an EGR mixer 114 that is located downstream of a throttle 112 and upstream of the intake manifold 104 in the illustrated implementation. The EGR mixer 114 is in the engine intake system, fluidically connected to the throttle 112, the intake manifold 104, and the EGR flow passage 108. The fluid connections can be made with conduits containing flow passages that allow fluid flow. In some implementations, the EGR mixer 114 can be included within a conduit connecting the intake manifold 104 to the throttle 112, within the intake manifold 104 itself, within the EGR flow passage 108, integrated within the throttle 112, or integrated into the EGR throttle valve 126. Details about an example EGR mixer are described later within this disclosure.

In the illustrated implementation, an exhaust gas cooler 110 is positioned in the EGR flow passage 108 between the exhaust manifold 106 and the EGR mixer 114. The exhaust gas cooler can operate to lower a temperature of the exhaust gas prior to the EGR mixer. The exhaust gas cooler is a heat exchanger, such as an air to air exchanger or an air to water exchanger.

In some implementations, the engine system 100 includes a compressor 118 upstream of the throttle 112. In an engine with a compressor 118 but no throttle, such as an unthrottled diesel engine, the throttle is not needed and the mixer can be downstream of the compressor. The compressor 118 can include a centrifugal compressor, a positive displacement compressor, or another type of compressor for increasing a pressure within the EGR flow passage 108 during engine operation. In some implementations, the engine system 100 can include an intercooler 120 that is configured to cool the compressed air prior to the air entering the manifold. In the illustrated implementation, the compressor 118 is part of a turbocharger. That is, a turbine 122 is located downstream of the exhaust manifold 106 and rotates as the exhaust gas expands through the turbine 122. The turbine 122 is coupled to the compressor 118, for example, via a shaft and imparts rotation on the compressor 118. While the illustrated implementation utilizes a turbocharger to increase the intake manifold pressure, other methods of compression can be used, for example an electric or engine powered compressor (e.g., supercharger). In some implementations, a separate controller 130 or engine control unit (ECU) is used to control various aspects of the system operation. For example, the controller 130 can adjust air-fuel ratios, spark timing, and EGR flow rates based on current operating conditions.

Figure 2:
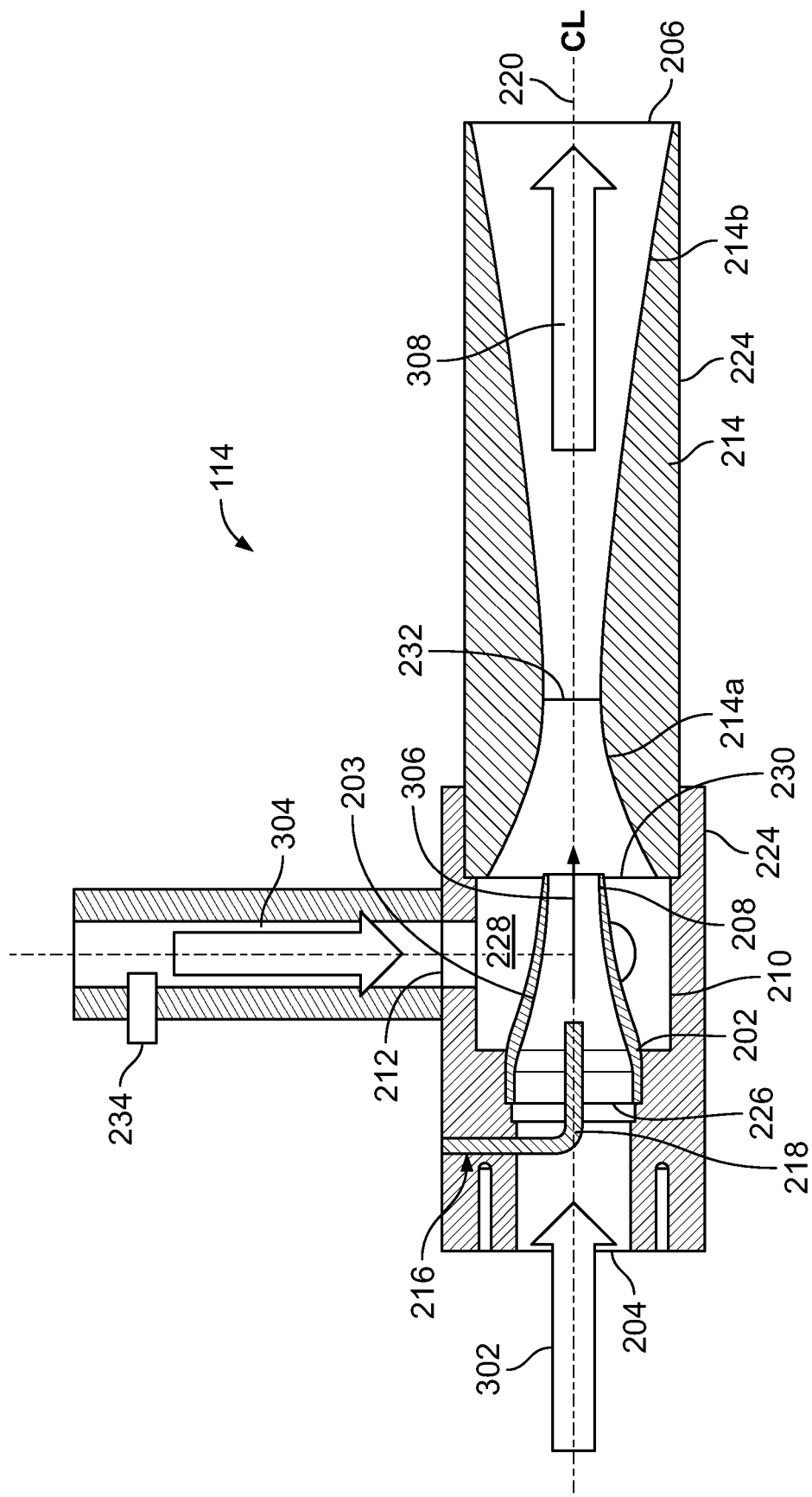
FIG. 2 is a side, half cross-sectional view schematic diagram of an example exhaust gas recirculation (EGR) mixer.

FIG. 2 is a side, half cross-sectional view schematic diagram of an example EGR mixer 114. The EGR mixer 114 is made up of one or more housings or casings. Openings in the end walls of the casings define an air inlet 204 and an outlet 206 of an interior flow passage 222 defined by casing(s) 224. The interior flow passage 222 directs flow from the air inlet 204 to the outlet 206 to allow flow through the EGR mixer 114. Within the casing(s) 224, the EGR mixer 114 includes a convergent nozzle 202 in a flow path from the air inlet 204 of the EGR mixer 114 and the outlet 206 of the EGR mixer 114. The convergent nozzle 202 includes a convergent portion 203 that converges in the direction of flow toward a convergent end 208. That is, the downstream end (outlet) of the convergent nozzle 202 has a smaller cross-sectional area, i.e., a smaller flow area, than the upstream end (inlet) 226 of the convergent nozzle 202. The convergent nozzle can include portions that do not converge, but remain relatively straight without changing a cross-sectional flow area. Such sections can be used to retain the convergent nozzle 202 within the EGR mixer 114. The EGR mixer 114 includes an exhaust gas receiver housing 210 and the housing 210 includes one or more exhaust gas inlets 212 fed from and fluidically connected to the EGR flow passage 108 and into an interior receiver cavity 228 of the exhaust gas housing 210. In the illustrated implementation, the housing 210 surrounds the convergent nozzle 202, such that a portion of the convergent nozzle 202 is within the interior receiver cavity 228. The convergent nozzle 202 is positioned to form a free jet of gas out of the convergent end 208 of the convergent nozzle 202. Also, the exhaust gas inlet 212 is upstream of the convergent end 208 of the convergent nozzle 202. While the illustrated implementation shows the convergent nozzle 202 to be at least partially within the exhaust gas receiver housing 210, other designs can be utilized. In some implementations, the air inlet 204 and the outlet 206 are provided with attachments or fittings to enable connection to the intake manifold 104 of the engine block 102 and/or the EGR mixer 114. In some instances, the convergent nozzle 202 can be modularly interchangeable with nozzles with a different inlet area 226 and/or convergent end 208, making the system readily changeable to fit multiple engine sizes. For example, the convergent nozzle 202 can be provided with threads or another form of a removable attachment to the remainder of the mixer casing(s) 224. Examples of this modularity are discussed later within this disclosure.

A convergent-divergent nozzle 214 is downstream of the convergent portion 203 of the convergent nozzle 202 and is fluidically coupled to receive fluid flow from the convergent end 208, the exhaust gas inlet 212, and, in certain instances, a fuel supply 216. In other words, the convergent-divergent nozzle 214 can act as an air-fuel-exhaust gas inlet for the intake manifold 104. To help facilitate mixing, an inlet 230 of the convergent-divergent nozzle 214 has a greater area than an exit of the convergent nozzle 202. The convergent-divergent nozzle includes three parts: the inlet 230, the throat 232, and the outlet 206. The throat 232 is the narrowest point of the convergent-divergent nozzle and is located and fluidically connected downstream of the inlet 230 of the convergent-divergent nozzle 214. The narrowing of the convergent-divergent nozzle at the throat 232 increases a flow velocity of a fluid flow as it passes through the convergent-divergent nozzle 214. The outlet 206 of the convergent-divergent nozzle 214 is fluidically connected to and upstream of the intake manifold 104. Between the throat 232 and the outlet 206, the cross-section of the flow passage through the convergent-divergent nozzle 214 increases. The increase in cross-sectional area slows the flow velocity and raises the pressure of the fluid flow. In certain instances, the increase in cross-sectional area can be sized to increase a pressure within the EGR mixer 114 so that the pressure drop across the EGR mixer 114 is zero, nominal, or otherwise small. The convergent-divergent nozzle 214 can include threads or another form of removable attachment at the inlet 230, the outlet 206, or both to allow the convergent-divergent nozzle 214 to be installed and fluidically connected to the remainder of the intake of the engine system 100. Like the convergent nozzle 202, the convergent-divergent nozzle 214 can be modularly interchangeable with nozzles 214 of the different inlet 230, throat 232, and outlet 206 areas to make the system readily changeable to fit multiple engine sizes.

The illustrated implementation shows the convergent nozzle and the convergent-divergent nozzle aligned at a same center axis 220, but in some implementations, the center axis of the convergent nozzle and the convergent-divergent nozzle might not be aligned or parallel. For example, space constraints may require the EGR mixer to have an angle between the axis of the convergent nozzle and the convergent-divergent nozzle. In some implementations, rather than having a substantially straight flow passage as shown in FIG. 2, the flow passage may be curved.

As illustrated, the fuel supply 216 includes a fuel supply tube 218 terminating parallel and centrally within the air flow path. The fuel supply tube 218 is configured to supply fuel into the air flow path in a direction of flow through the EGR mixer 114, and upstream of the convergent portion 203 of the convergent nozzle 202. In some implementations, the fuel supply tube 218 can be a gaseous fuel supply tube, coupled to a source of gaseous fuel. However, the fuel delivered by the fuel supply tube 218 can include any combustible fluid, such as natural gas, gasoline, or diesel. While shown as a single tube, the fuel supply tube 218 can be configured in other ways, for example as a cross through the flow area of the mixer, as fuel delivery holes along the perimeter of the flow area, or in another manner. While the illustrated implementation shows a fuel supply tube 218 configured to inject fuel upstream of the convergent portion 203 of the convergent nozzle 202, fuel can also be added with a fuel supply port 234 upstream of the exhaust gas inlet 212. That is, fuel can be injected into the EGR stream. Such a port can include a gaseous fuel supply port. In some instances, the fuel can be delivered at high velocity, with velocities up to and including sonic flow at the fuel supply tube 218, such that a fuel/air jet pump is also created, allowing the fuel to provide additional motive force for the primary air flow into and thru the nozzle. In such a case, higher pressure, such that a sonic jet can be generated, further enhances mixing of the fuel and air. This reduces the need for the fuel pressure regulator. Additionally, if the fuel jet is cold via the Joules-Thompson effect, it will cool the air/fuel stream, thus reducing the air path charge air cooler heat removal requirements as well. Alternatively or in addition, fuel can be added upstream of the throttle 112.

The illustrated implementation operates as follows. The convergent portion 203 of the convergent nozzle 202 increases a velocity and decreases a pressure of an air flow 302 in the EGR mixer 114. An exhaust flow 304 is drawn into the EGR mixer 114 through the exhaust gas inlet 212 in response to (e.g., because of) the decreased pressure of the free jet air flow 302 exiting the convergent nozzle 202. The exhaust flow 304 is directed from the exhaust manifold 106 eventually to the point downstream of the convergent portion 203 of the convergent nozzle 202. The air flow 302, the exhaust flow 304, and a fuel flow 306 are mixed to form a combustion mixture 308 with a second convergent nozzle 214a positioned downstream of the convergent portion 203 of the convergent nozzle 202. A pressure of the combustion mixture is increased and a velocity of the combustion mixture is reduced with a divergent nozzle 214b. While the second convergent nozzle 214a and the divergent nozzle 214b are illustrated as a single convergent-divergent nozzle 214, the second convergent nozzle 214a and the divergent nozzle 214b can be separate and distinct parts.

In the illustrated implementation, the fuel flow 306 is supplied into the air flow 302 with a fuel supply tube 218 parallel and in-line with a center of an air flow passage. The fuel flow is supplied upstream of the convergent portion 203 of the convergent nozzle 202. In some implementations, the fuel flow is supplied into the exhaust flow with a fuel supply port. Regardless of the implementation used, the fuel flow 306 can include a gaseous fuel flow. In some implementations, the fuel flow 306 has an injection velocity higher than an air flow 302 velocity. Such a high velocity can aid in mixing the air flow 302, fuel flow 306, and exhaust flow 304.

In some implementations, the throat 232 of the convergent-divergent nozzle 214 has a cross-sectional flow area that is larger than the cross sectional flow area of the convergent end 208 of the convergent nozzle 202. For example, the smallest flow area of the throat 232 of the convergent-divergent nozzle 214 can be −1.1-3 times the smallest flow area of the convergent end 208 end of the convergent nozzle 202. In general, efficient performance is achieved when the throat 232 is sized such that the two fluid streams can pass through the throat 232 at roughly the same velocity. For example, in a case of 25% EGR at 120° C., the throat 232 area is about 1.5 times the flow area of the convergent end 208 of the convergent nozzle 202.

Figure 3:
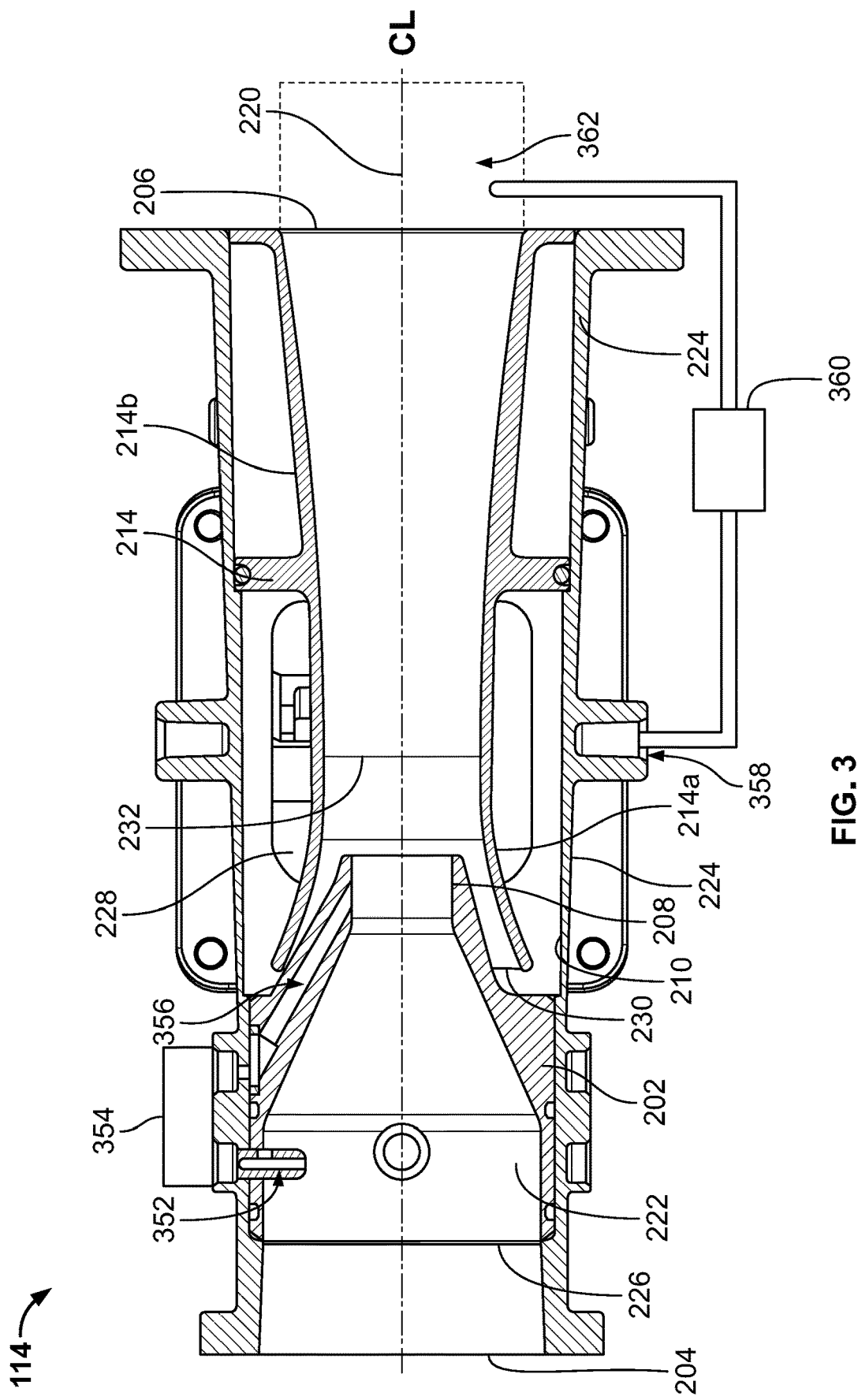
FIG. 3 is a side, half cross-sectional view schematic diagram of an example EGR mixer with differential pressure sensors and pressure sensing ports.

FIG. 3 is a side, half cross-sectional view schematic diagram of an example EGR mixer 114 with differential pressure sensors and pressure sensing ports. A first pressure port 352 is positioned upstream of the convergent portion 203 of the convergent nozzle 202. The first pressure port 352 provides a location to sense pressure upstream of the convergent nozzle 202 by allowing fluid communication between the interior flow passage 222 and a first pressure differential sensor 354. A second pressure port 356 is positioned after the convergent portion 203 of the convergent nozzle 202, for example at the convergent end 208. The second pressure port 356 provides a location to sense pressure at a convergent end 208 of the convergent nozzle 202 by allowing fluid communication between the interior flow passage 222 and a first pressure differential sensor 354. Though illustrated with a differential sensor, separate, discrete sensors can be used with similar effect. Alternatively or in addition, a virtual sensor can be used in lieu of a discrete sensor. As illustrated, the second pressure port 356 is integrated into the convergent nozzle 202, but a separate, discrete sensing port can be used with similar results.

A third pressure port 358 is positioned in the throat 232 of the convergent-divergent nozzle 214. The third pressure port 358 provides a location to sense a pressure within the throat 232 of the convergent-divergent nozzle 214 by allowing fluid communication between the interior flow passage 222 and a second pressure differential sensor 360. A fourth pressure port 362 is positioned downstream of the throat 232 of the convergent-divergent nozzle 214. The fourth pressure port 362 provides a location to sense a pressure downstream of the convergent-divergent nozzle 214 by allowing fluid communication between the interior flow passage 222 and a second pressure differential sensor 360.

The pressure differential sensed by the first differential pressure sensor 354 can be used to determine a mass air-flow (MAF) rate passing through the EGR mixer 114. The second differential pressure sensed by the second pressure differential sensor 360 can used to determine an air-fuel-exhaust mass flow rate. A difference between the mass air-flow rate and the air-fuel-exhaust flow rate can be used to calculate an EGR mass flow rate. In certain instances, such a calculation can be performed by the controller 130 (FIG. 1). The MAF and EGR flow rates can be used as inputs for the controller to adjust a variety of parameters within the engine system 100. In certain instances, the controller 130 is an engine control unit (ECU) that controls some or all aspects of the engine system's 100 operation, such as fuel supply, air, ignition and/or other engine operational parameters. In certain instances, the controller 130 is a separate control unit from the engine system's ECU. The controller 130 also need not send actuation and/or control signals to the engine system 100, but could instead provide information, such as the MAF and EGR flow rates, to an ECU for use by the ECU in controlling the engine system 100.

Figure 4:
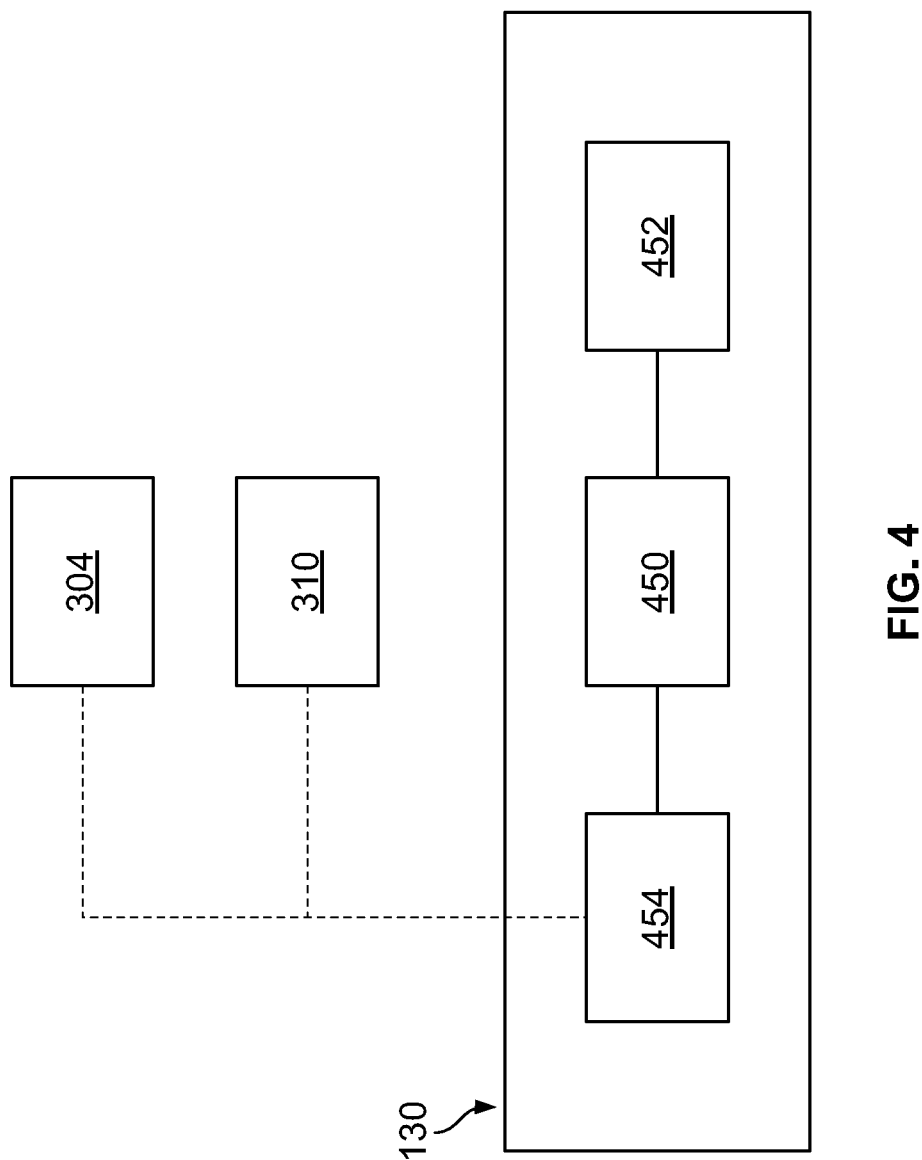
FIG. 4 is a block diagram of an example controller that can be used with aspects of this disclosure.

FIG. 4 is a block diagram of an example controller 130 that can be used with aspects of this disclosure. The controller 130 can, among other things, monitor parameters of the system and send signals to actuate and/or adjust various operating parameters of the system. As shown in FIG. 4, the controller 130 can include one or more processors 450 and non-transitory storage media (e.g., memory 452) containing instructions that cause the processors 450 to perform operations described herein. The processors 450 are coupled to an input/output (I/O) interface 454 for sending and receiving communications with components in the system, including, for example, the first differential pressure sensor 354 and the second pressure differential sensor 360. In certain instances, the controller 130 can additionally communicate status with and send actuation and/or control signals to one or more of the various system components (including the throttle 112 and the EGR throttle valve 126) of the engine system 100, as well as other sensors (e.g., pressure sensors, temperature sensors, knock sensors, and other types of sensors) provided in the engine system 100.

Figure 5:
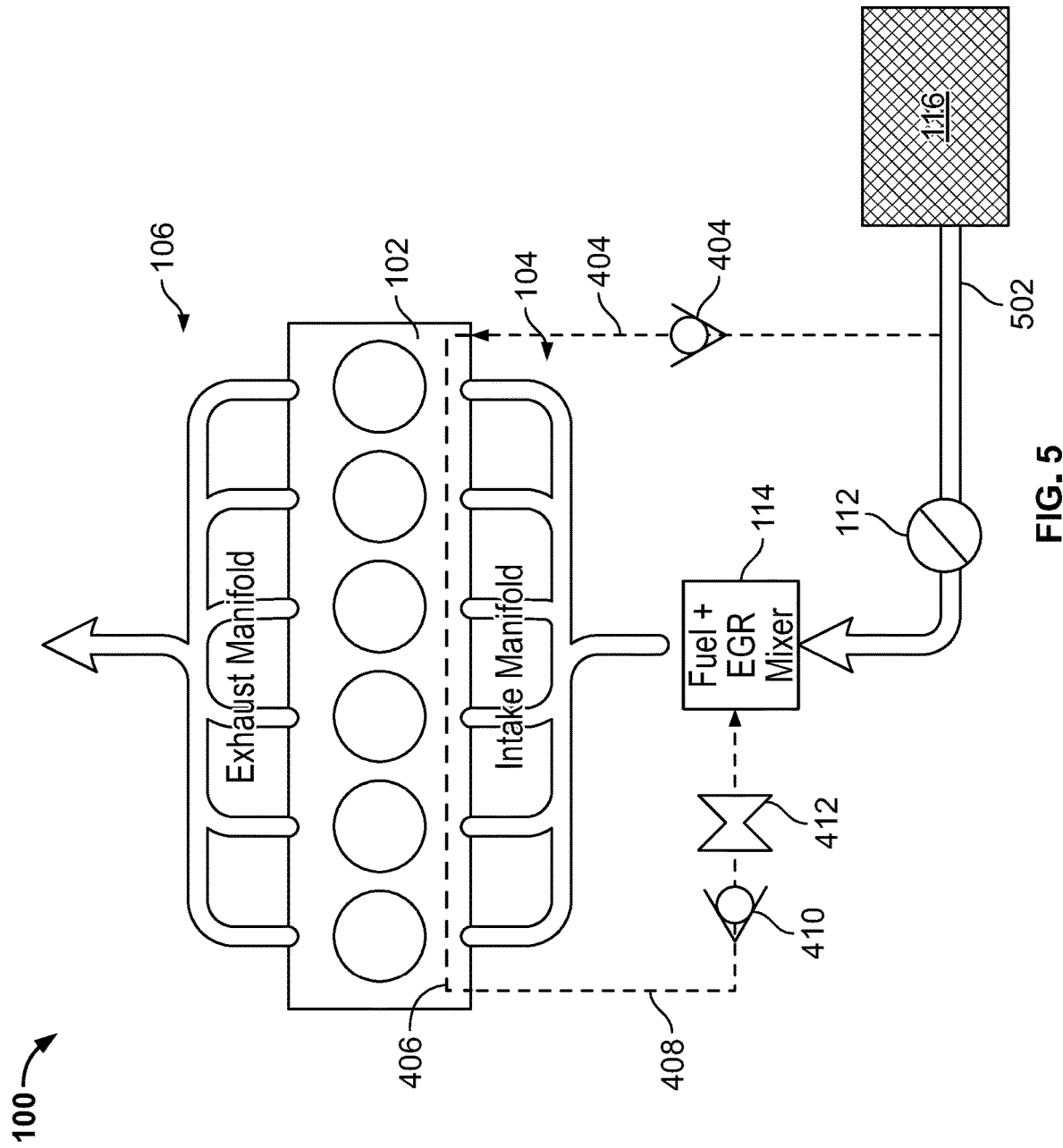
FIG. 5 is a schematic diagram of an example internal combustion engine system with crank case venting.

FIG. 5 is a schematic diagram of an example internal combustion engine system with crank case venting. As illustrated, the engine system 100 includes a first crank case vent conduit 402 that is fluidically connected to an air intake conduit 502 upstream of the throttle 112. The first crank case vent conduit 402 draws air from the air intake conduit 502 toward the engine block 102. In particular, the first crank case vent conduit 402 directs air to flow through the crank case of the engine block 102. While illustrated as connecting directly to the engine block 102, the first crank case vent conduit 402 can attach to any part of the engine, so long as it is fluidically connected to the crank case. In some implementations, an intake check valve 404 can be included within first crank case vent conduit 402 to ensure that there is no backflow. The check valve 404 can be any check-valve with a low pressure drop appropriate for the service, such as a ball-type check valve. Within an engine block 102 is a crank case flow path 406 through the crank case. In some configurations, the crank case can be separate from the engine block. In such a configuration, the crank case flow path 406 will flow through the separate crank case. A second crank case vent conduit 408 fluidically connects the crank case to a point downstream of the throttle 112. While illustrated as connecting directly to the engine block 102, the second crank case vent conduit 408 can attach to any part of the engine, so long as it is fluidically connected to the crank case. A pressure drop across the throttle 112 causes a pressure differential to drive airflow through the first crank case vent conduit 402, the crank case flow path 406, and the second crank case vent conduit 408. In some implementations, a second check valve 410 can be included within second crank case vent conduit 408 to ensure that there is no backflow. The check valve can be any check-valve with a low pressure drop appropriate for the service, such as a ball-type check valve. In some implementations, a restriction 412 can be positioned within the first crank case vent conduit 402 or the second crank case vent conduit 408 to regulate an flow rate of air through the crank case. The restriction 412 can include a restriction orifice, a regulating valve, or another device for regulating the flow through conduit 401. The restriction 412 regulates the flowrate by controlling a cross-sectional flow area of the second crank case vent conduit 408. The cross-sectional flow area is inversely proportional to the pressure drop across the restriction 412, and in turn controls the flow rate through the flow restriction 412.

As illustrated, the second conduit 408 is fluidically connected to the EGR mixer 114. To help facilitate flow, the second conduit 408 can feed into the EGR mixer upstream of the convergent-divergent nozzle 214 and downstream of the convergent nozzle (see FIG. 2 and/or FIG. 3), the lowest pressure system of the EGR mixer 114. For example, the second conduit can feed into the exhaust housing 210. The pressure drop creates a substantial pressure differential to drive flow through the crank case. In some implementations, the second conduit 408 can be inserted into the air-flow upstream of the EGR mixer 114. In such an implementation, the EGR mixer 114 is in-line within the intake conduit 502 (FIG. 5) between the throttle 112 and the intake manifold. In some implementations, the second crank case vent conduit 408 can be connected to the intake conduit 502 between the throttle 112 and the EGR mixer 114. In such an implementation, the pressure differential across the throttle 112 is sufficient to drive flow through the crank case. Directing the crankcase vent gas between the throttle 112 and the EGR mixing section allows the crankcase vent gas to be mixed along with the EGR.

Figure 6A:
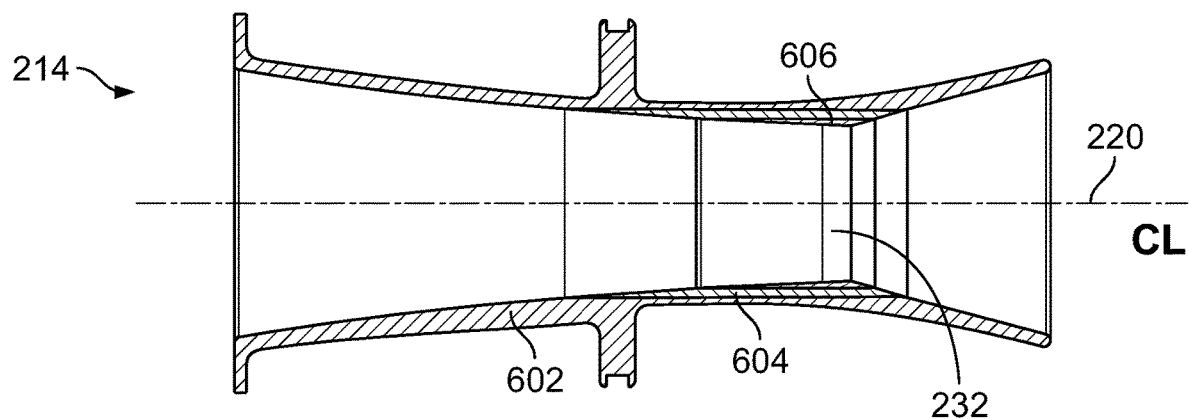
FIG. 6A is a side, half-cross sectional view of interchangeable convergent-divergent nozzle modules.

FIG. 6A is a side, half-cross sectional view of example convergent-divergent nozzle modules that can be used in constructing the EGR mixer 114 according to FIG. 3. To ease construction, the EGR mixer 114 can be constructed using a common outer piece (e.g., the mixer casing 224 of FIG. 3) and various nozzle modules that can be inserted into the mixer casing 224 depending on the flow requirements for the EGR mixer 114. For example, FIG. 6A shows a convergent-divergent nozzle 602 that can be designed for a larger, higher load engine, while other nozzle profiles can be inserted for applications using a smaller or lower load engine. The second convergent-divergent nozzle 604 or the third convergent nozzle 606 reduces a cross-sectional flow area through the throat 232 of the convergent-divergent nozzle section.

In some implementations, the multiple convergent-divergent nozzles can be cast or molded with an identical outer mold, while the interior profile can be cast or molded with interchangeable inner molds that are configured to mate with the outer mold. In some implementations, various convergent-divergent nozzle modules are manufactured with a common inner mold and outer mold, then have a specified profile machined along the interior of the convergent-divergent nozzle module. The interchangeable convergent-divergent nozzles (602, 604, and 606) can be attached to the mixer casing 224 in a variety of ways, for example, with a threaded connection, bayonet-style connection, or a press fit connection. In some implementations, the convergent-divergent nozzle is retained in place within the assembly by mating components. For example, the convergent-divergent nozzle can be compressed between a shoulder in the housing and a mating component, such as an elbow within a fluid conduit.

Figure 6B:
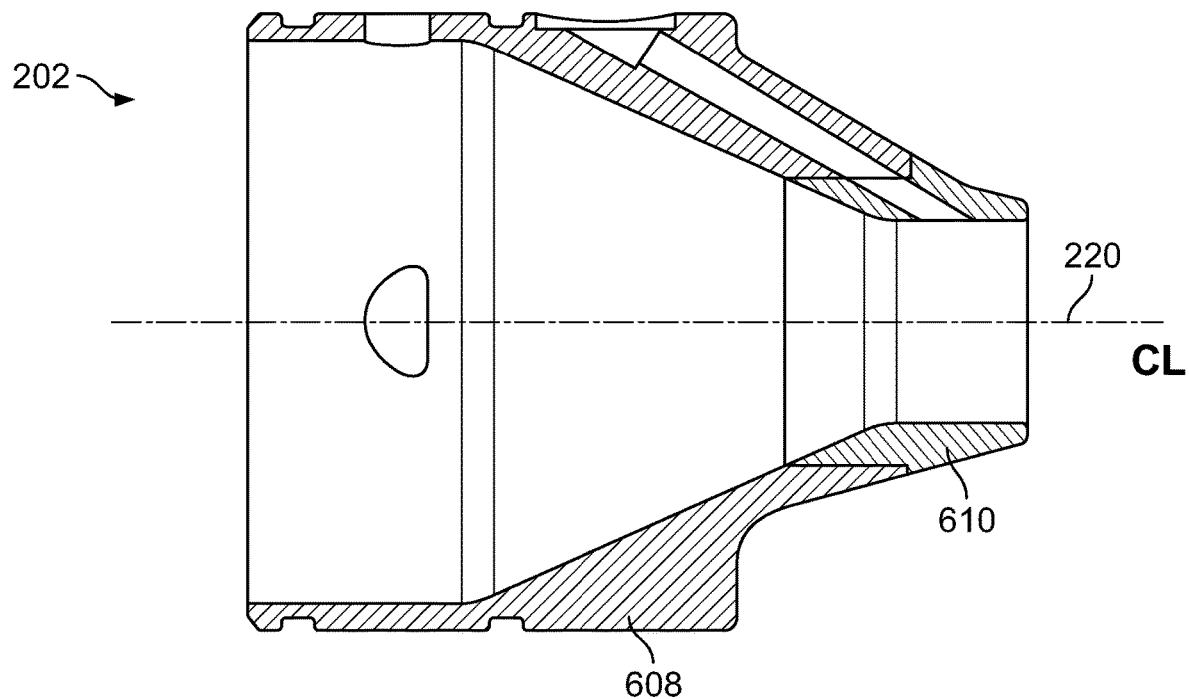
FIG. 6B is a side, half-cross sectional view of interchangeable convergent nozzle modules.

FIG. 6B is a side, half-cross sectional view of interchangeable convergent nozzles. To ease construction, the EGR mixer 114 can be constructed using a common outer piece (e.g., the mixer casing 224) and interchangeable convergent nozzles that can be inserted into the common outer piece depending on the size of the engine within the engine system and the desired EGR flow rate. For example, a first convergent nozzle 608 can be designed for a larger, higher load engine while the second convergent nozzle 610 can be inserted for applications using a smaller or lower load engine. The second convergent nozzle 610, as illustrated, has a reduced cross-sectional flow area through the convergent end of the second convergent nozzle 610 as compared to the first convergent nozzle 608.

In some implementations, the multiple convergent nozzles can be cast or molded with an identical outer mold, while the interior profile can be cast or molded with interchangeable inner molds that are configured to mate with the outer mold. In some implementations, various convergent nozzle modules are manufactured with a common inner mold and outer mold, then have a specified profile machined along the interior of the convergent nozzle module. The various convergent nozzle modules (608 and 610) can be attached to the mixer casing 224 in a variety of ways, for example, with a threaded connection, bayonet-style connection, or a press fit connection. In some implementations, the convergent nozzle is held in place by the fuel tube. That is, the fuel tube acts as a retaining pin providing an interference to prevent movement between the convergent nozzle and the housing.

While illustrated and described as using two modules, a convergent nozzle module and a convergent-divergent nozzle, more or fewer modules can be used without departing from this disclosure. For example, the convergent-divergent nozzle can be constructed with separate convergent nozzle modules and divergent nozzle modules. Alternatively or in addition, all or part of the nozzles can be attached to the housing 210 as a single piece or in multiple pieces. For example, the convergent nozzle 202 and the housing 210 can be constructed as a single casting configured to receive a separate convergent-divergent nozzle module (602, 604, or 606). In another example, the convergent-divergent nozzle 214 and the housing 210 can be constructed as a single casting configured to receive a separate convergent nozzle module (608 or 610).

Figure 6C:
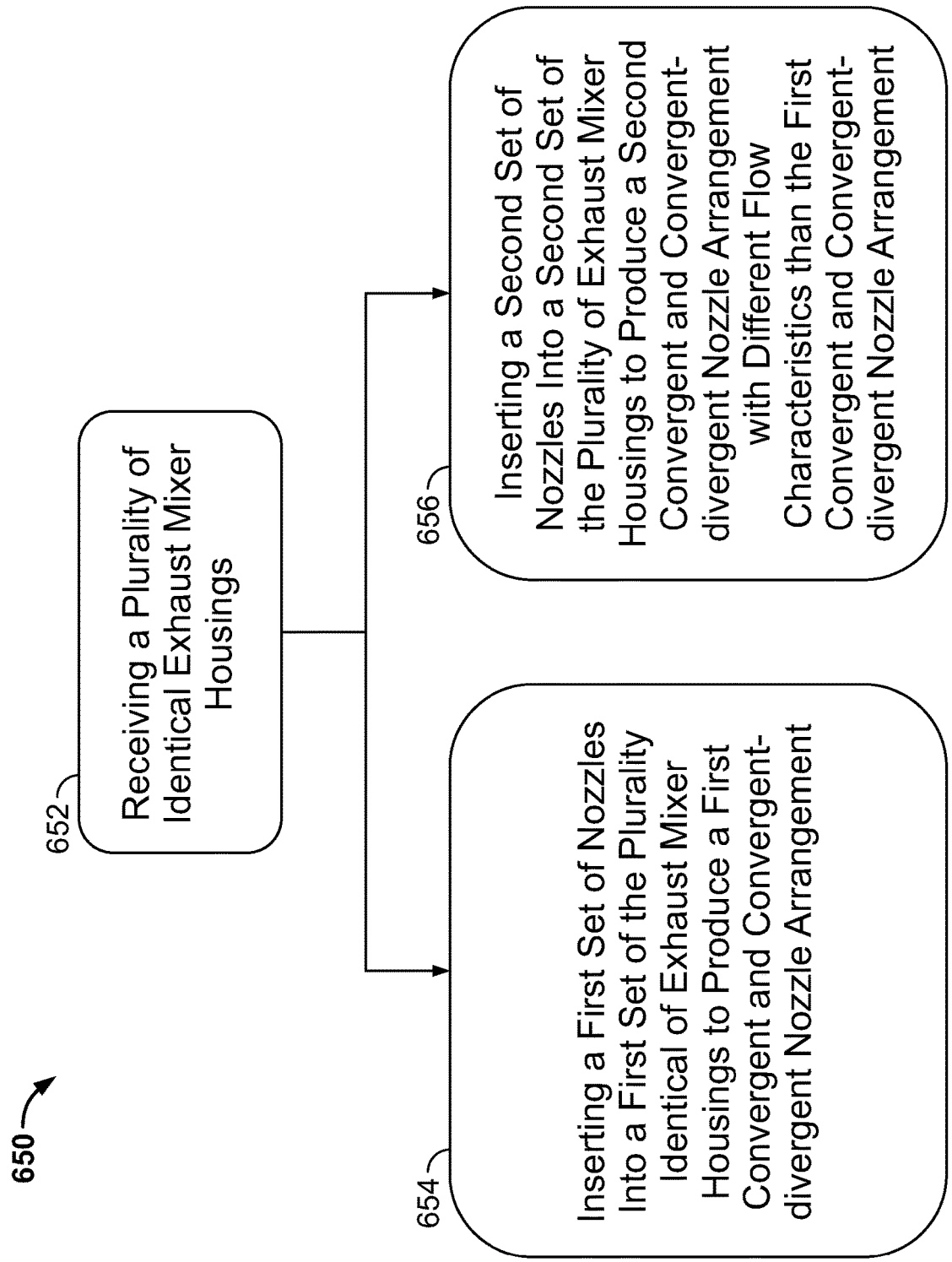
FIG. 6C is a flowchart of an example method that can be used with aspects of this disclosure.

FIG. 6C is a flowchart of an example method 650 that can be used with aspects of this disclosure. In particular, the method 650 can be used during manufacture of the EGR mixer 114. At 652, substantially identical exhaust mixer housings are received. At 654, a first set of nozzles are inserted into a first set of the substantially identical exhaust mixer housings to produce a first convergent and convergent-divergent nozzle arrangement. In some instances, the first set of nozzles are a set of convergent nozzles. In some instances, the first set of nozzles are a set of convergent-divergent nozzles.

At 656, a second set of nozzles are inserted into a second set of exhaust mixer housings to produce a second convergent and convergent-divergent nozzle arrangement with different flow characteristics than the first convergent and convergent-divergent nozzle arrangement. In some instances, the second set of nozzles are a second set of convergent-divergent nozzles having a different cross-sectional area of a throat than the first set of nozzles. In some instances, the second set of nozzles are a second set of convergent nozzles having a different cross-sectional area of a convergent end than the first set of nozzles.

FIGS. 7A-7C are a side cross-sectional view, a cross-sectional view along line 7B-7B, and a perspective view of an example EGR mixer 114 with a liquid drain channel 702. As gas flows through the convergent portion 203 of the convergent nozzle 202 and the subsequent throat 232 of the convergent-divergent nozzle 214, liquids, such as water, often drop from the gas flow in response to the rapid decrease in pressure and/or the rapid cooling of the EGR. The liquid can build within the EGR mixer to the point that liquid carry over and liquid slugging can occur. That is, a large amount of liquid can be carried into the intake manifold and subsequently, into a combustion chamber of the internal combustion engine.

In some implementations, a drain channel 702 can be included in the convergent-divergent nozzle 214. The drain channel 702 allows liquids to trickle through the EGR mixer 114 at a low enough rate to prevent a liquid slugging event that can cause damage to the internal combustion engine. The drain channel 702 is located on a bottom side of the convergent-divergent nozzle 214. The drain channel 702 begins outside the convergent-divergent nozzle, for example, with the exhaust housing 210, and end at the outlet 206 of the EGR mixer 114. The exhaust housing 210 encloses the convergent-divergent nozzle 214 and defines a chamber below the nozzle inlet. During operation, liquid build up within the exhaust housing 210 can rise above the inlet of the convergent-divergent nozzle and be drawn into a main flow through the mixer. The channel is sized, based on expected water drop-out and the expected pressure drop within the EGR mixer, to maintain a liquid level below the inlet of the convergent-divergent nozzle without significantly altering the flow characteristics through the EGR mixer 114.

The drain channel is also arranged as to adjust a maximum height of liquid build-up within the EGR. For example, a maximum liquid level in the EGR mixer without the drain channel 702 is at a first level 704. This level has a sufficient quantity of liquid to cause an engine damaging liquid slugging event. With the drain channel, the maximum liquid level is at a second level 706. In this scenario, liquid is constantly flowed back into the gas stream at a low enough rate to vaporize prior to entering the combustion chamber, minimizing the risk of an engine-damaging liquid slugging event. In some implementations, the drain channel 702 is also of sufficient size to prevent particulates from blocking the channel.

Figures 8A, 8B:
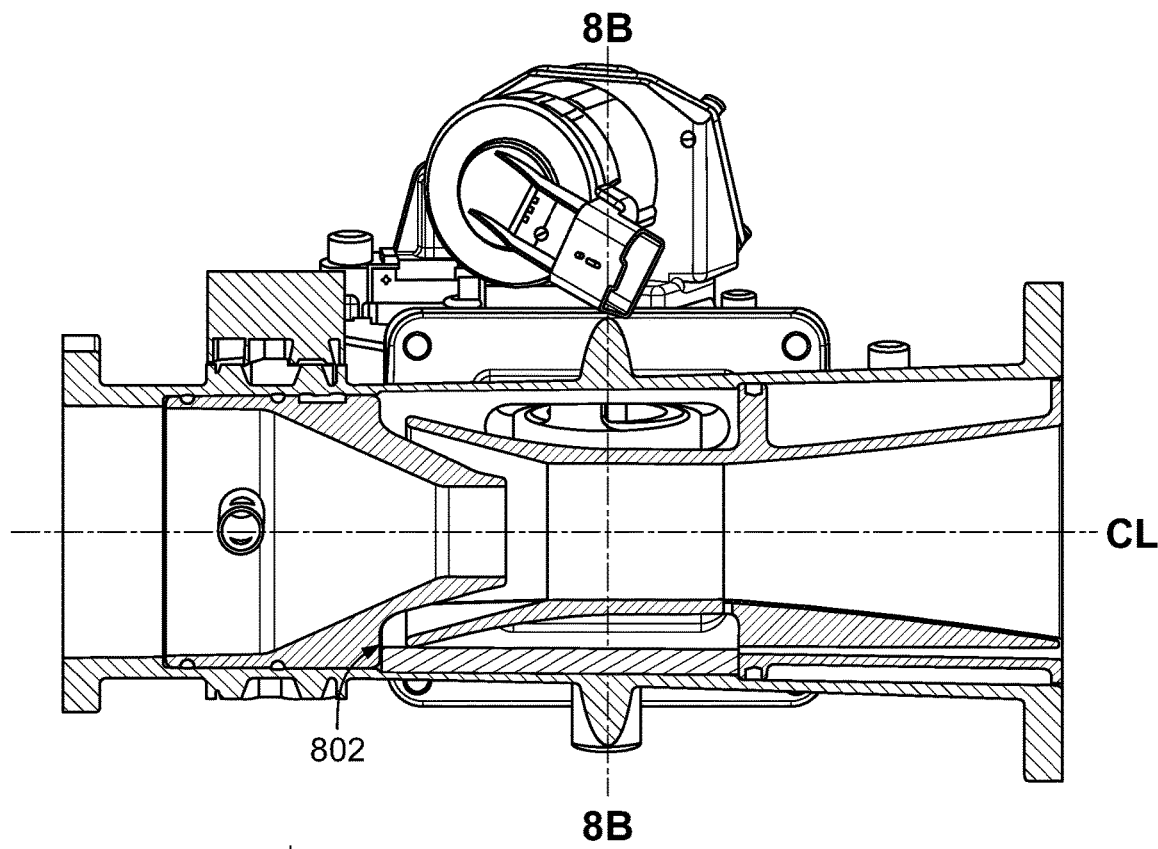
FIGS. 8A-8B are a side cross-sectional view and a cross-sectional view along line 8B-8B of an example EGR mixer with a plug to prevent liquid build-up.

Alternatively or in addition, a plug can be installed to prevent a liquid slugging event. FIGS. 8A-8B are a side cross-sectional view and a cross-sectional view along line 8B-8B of an example exhaust gas recirculation mixer with a plug to prevent liquid build-up. The plug 802 occupies the space that would potentially retain sufficient water to cause a liquid slugging event. The plug 802 changes a cross-sectional flow area of the interior receiver cavity 228 so that it is non-circular. That is, the inner profile of the interior receiver cavity 228 has a greater radius along an upper portion of the inner profile than the lower portion of the inner profile. As the plug 802 occupies the volume that would allow such a buildup, liquid that is dropped out of the gas stream is immediately flowed with the main gas stream at low enough rate to vaporize prior to entering the combustion chamber, minimizing the risk of a liquid slugging event.

While this disclosure contains many specific implementation details, these should not be construed as limitations on the scope of what may be claimed, but rather as descriptions of features specific to particular implementations of particular subject matters. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described components and systems can generally be integrated together in a single product or packaged into multiple products.

A number of implementations of the subject matter have been described. Nevertheless, it will be understood that various modifications may be made. Accordingly, other implementations are within the scope of the following claims.

What is claimed is:

1. An exhaust gas recirculation mixer system comprising:
   an exhaust gas housing comprising an exhaust gas inlet into an interior of the exhaust gas housing;
   a mixer housing;
   a convergent nozzle in the mixer housing and in a flow path from an air inlet of the mixer to an outlet of the mixer, the convergent nozzle converging toward the outlet of the mixer;
   a convergent-divergent nozzle in the mixer housing and comprising an air-exhaust gas inlet in fluid communication to receive fluid flow from the convergent nozzle and from the interior of the exhaust gas housing;
   a first nozzle module configured to be received in the mixer housing and, when received in the mixer housing, define at least a portion of the convergent nozzle or the convergent-divergent nozzle; and
   a second nozzle module configured to be received in the mixer housing when the first nozzle module is not in mixer housing, the second nozzle module, when received in the mixer housing, configured to define at least a portion of the convergent or the convergent-divergent nozzle, and the second nozzle module having a different flow characteristic than the first nozzle module.

2. The exhaust gas recirculation mixer system of claim 1, wherein the first nozzle module defines a portion of the convergent nozzle.

3. The exhaust gas recirculation mixer system of claim 1, wherein the second nozzle module defines a portion of the convergent-divergent nozzle.

4. The exhaust gas recirculation mixer system of claim 1, wherein an inlet of the convergent-divergent nozzle is positioned to receive an air-exhaust-fuel mixture.

5. The exhaust gas recirculation mixer system of claim 1, further comprising:
a first pressure port positioned at a convergent end of the convergent nozzle, the first pressure port providing a location to sense a first pressure at the convergent end of the convergent nozzle.

6. The exhaust gas recirculation mixer system of claim 5, further comprising:
a second pressure port upstream of a convergent portion of the convergent nozzle, the second pressure port providing a location to sense a second pressure upstream of the convergent nozzle.

7. The exhaust gas recirculation mixer system of claim 5, further comprising:
a second pressure port positioned in a throat of the convergent-divergent nozzle, the second pressure port providing a location to sense a second pressure within the throat of the convergent-divergent nozzle; and
a third pressure port positioned downstream of a divergent portion of the convergent-divergent nozzle, the third pressure port providing a location to sense a third pressure downstream of the convergent-divergent nozzle.

8. The exhaust gas recirculation mixer system of claim 1, further comprising:
a liquid channel defined by the convergent-divergent nozzle, the liquid channel having an inlet positioned between the convergent nozzle and the convergent-divergent nozzle, the liquid channel positioned and sized to direct and regulate liquid drop-out towards an outlet of the exhaust gas recirculation mixer.

9. The exhaust gas recirculation mixer system of claim 1, wherein an inner surface of the mixer housing is non-circular, having a greater radius along an upper portion of the mixer housing than the lower portion of the mixer housing.

10. The exhaust gas recirculation mixer system of claim 1, wherein a throat of the convergent-divergent nozzle has a greater cross-sectional area than a convergent end of the convergent nozzle.

11. The exhaust gas recirculation mixer system of claim 1, wherein a cross-sectional area of a throat of the convergent-divergent nozzle is 1.1-3 times greater than a cross-sectional area of a convergent end of the convergent nozzle.

12. A method comprising:
receiving a plurality of identical exhaust mixer housings;
inserting a first set of nozzle modules into a first set of the plurality of identical exhaust mixer housings to produce a first convergent and convergent-divergent nozzle arrangement; and
inserting a second set of nozzle modules into a second set of the plurality of identical exhaust mixer housing to produce a second, different convergent and convergent-divergent nozzle arrangement.

13. The method of claim 12, wherein the first set of nozzle modules is a set of convergent nozzles.

14. The method of claim 12, wherein the first set of nozzle modules is a set of convergent-divergent nozzles.

15. The method of claim 12, wherein the second convergent and convergent-divergent nozzle arrangement has different flow characteristics than the first convergent and convergent-divergent nozzle arrangement.

16. The method of claim 15, wherein the second set of nozzle modules comprises a second set of convergent-divergent nozzles having a different cross-sectional area of a throat than the first set of nozzles.

17. The method of claim 15, wherein the second set of nozzle modules comprises a set of convergent nozzles having a different cross-sectional area of a convergent end than the first set of nozzles.

18. An engine system comprising:
an intake manifold configured to receive a combustible mixture configured to be combusted within a combustion chamber;
a throttle upstream of the intake manifold, the throttle configured to at least partially regulate an air flow into the intake manifold;
an exhaust manifold configured to receive combustion products from the combustion chamber; and
an exhaust gas recirculation mixer downstream of the throttle and upstream of an intake manifold, the exhaust gas recirculation mixer comprising:
a mixer housing defining an exhaust gas inlet into an interior of the mixer housing;
a convergent nozzle in the mixer housing and in a flow path from an air inlet of the mixer to an outlet of the mixer, the convergent nozzle converging toward the outlet of the mixer;
a convergent-divergent nozzle in the mixer housing and comprising an air-exhaust gas inlet in fluid communication to receive fluid flow from the convergent nozzle and from the interior of the exhaust gas housing;
a first nozzle module configured to be received in the mixer housing and, when received in the mixer housing, define at least a portion of the convergent nozzle or the convergent-divergent nozzle; and
a second nozzle module configured to be received in the mixer housing when the first nozzle module is not in mixer housing, the second nozzle module, when received in the mixer housing, configured to define at least a portion of the convergent or the convergent-divergent nozzle, and the second nozzle module having a different flow characteristic than the first nozzle module.

19. The engine system of claim 18, wherein the recirculation mixer comprises:
a first pressure port positioned upstream of the convergent nozzle, the first pressure port providing a first location to sense a first pressure upstream of the convergent nozzle; and
a second pressure port positioned at a convergent end of the convergent nozzle, the second pressure port providing a second location to sense a second pressure at the convergent end of the convergent nozzle.

20. The engine system of claim 19, wherein the recirculation mixer comprises:
a third pressure port positioned in a throat of the convergent-divergent nozzle, the third pressure port providing a third location to sense a third pressure within the throat of the convergent-divergent nozzle; and
a fourth pressure port positioned downstream of the convergent-divergent nozzle, the fourth pressure port providing a fourth location to sense a third pressure downstream of the convergent-divergent nozzle.

21. The engine system of claim 20, further comprising a controller comprising:

one or more processors; and a non-transitory computer-readable storage medium coupled to the one or more processors and storing programming instructions for execution by the one or more processors, the programming instructions instruct the one or more processors to:

determine a first differential pressure between the first pressure location positioned upstream of the convergent nozzle and the second pressure location positioned at a convergent end of the convergent nozzle;

determine a mass air-flow rate based on the first determined differential pressure;

determine a second differential pressure between the third pressure location positioned within a throat of the convergent-divergent nozzle and fourth pressure location positioned downstream of the convergent-divergent nozzle; and determine an air-fuel-exhaust flow rate based on the second determined differential pressure.

22. The system of claim 18, further comprising:

a crank case within an engine block;

a first conduit fluidically connecting the crank case to a point upstream of the throttle; and a second conduit fluidically connecting the crank case to a point downstream of the throttle, a pressure differential across the throttle causing air to flow through the crank case.

23. The system of claim 22, wherein the second conduit is fluidically connected to the exhaust gas recirculation mixer upstream of the convergent-divergent nozzle and downstream of the convergent nozzle.

* * * * *

UNITED STATES PATENT AND TRADEMARK OFFICE
CERTIFICATE OF CORRECTION

PATENT NO.         : 10,995,705 B2
APPLICATION NO.    : 16/269735
DATED              : May 4, 2021
INVENTOR(S)        : Daniel B. Mastbergen et al.

It is certified that error appears in the above-identified patent and that said Letters Patent is hereby corrected as shown below:

In the Drawings

Sheet 7 of 9, Fig. 6C, Reference Numeral 654, please replace "Identical of" with -- of Identical --.

In the Specification

In Column 2, Line 28, please delete "nozzle" and insert -- nozzle. --.

In Column 3, Line 6-7, please delete "convergent divergent" and insert -- convergent-divergent --.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*